United States Patent Office 3,775,464

Patented Nov. 27, 1973

3,775,464

PROCESS FOR PREPARING 2-DIALKYLAMINO-ETHYL 4-ALKOXY-3-AMINOBENZOATES

Giorgio Pifferi, Milan, Italy, assignor to I.S.F. S.p.A., Milan, Italy

No Drawing. Filed Aug. 10, 1970, Ser. No. 62,716
Claims priority, application Italy, Apr. 22, 1970, 23,712/70
Int. Cl. C07c *101/54*
U.S. Cl. 260—472 7 Claims

ABSTRACT OF THE DISCLOSURE 2-dialkylaminoethyl 4-alkoxy-3-aminobenzoates, of the general formula:

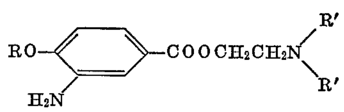

are prepared by a new and simpler process which comprises alkoxylating a 4-halo-3-nitrobenzoic acid with an alkali metal alkoxide in an aprotic solvent, esterifying and reducing the ester by conventional means.

The present invention refers to a new process for preparing pharmacologically active compounds. More particularly the invention is concerned with the manufacture of 2-dialkylaminoethyl 4-alkoxy-3-aminobenzoates starting from 4-halo-3-nitrobenzoic acids of the general formula:

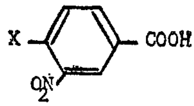

wherein X=Cl, Br, I or F, and preparing their non-toxic salts with common mineral acids.

The compounds prepared according to the invention are represented by the general formula:

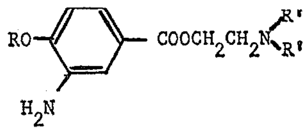

wherein R represents a lower alkyl radical of 1 to 6 carbon atoms inclusive and R′ is hydrogen, $CH_3$ or $C_2H_5$.

The known processes for preparing the above compounds involve the alkylation of 4-hydroxy-3-nitrobenzoic acid, for instance by means of an o-alkyl arylsulfonate in xylene solution (R. O. Clinton et al., J. Am. Chem. Soc., 74, 592–598 (1952), and the subsequent alkaline saponification of the ester to the free acid.

The latter is then converted to the corresponding dialkylaminoethyl ester by conventional techniques, e.g. by reacting the acyl chloride with a dialkylaminoethanol, after which the ester is reduced by conventional means.

The representative reaction scheme of the above known processes is as follows:

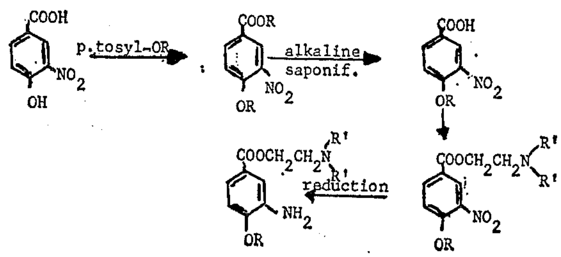

The known processes for preparing 2-dialkylaminoethyl 4-alkoxy-3-aminobenzoates show several drawbacks. First, they require a large number of steps which make them tedious and costly. Furthermore, the initial step; that is, the alkylation of 4-hydroxy-3-nitrobenzoic acid, requires the use of costly reagents and involves the simultaneous esterification of the carboxyl group which necessitates a further step of alkaline saponification of the ester.

The process of this invention overcomes these and other drawbacks of the known processes, permitting the 2-dialkylaminoethyl 4-alkoxy-3-aminobenzoates to be prepared in fewer steps by using a cheaper starting material (e.g. 4-chloro-3-nitrobenzoic acid) and one of the cheapest alkylating agents among those commonly used. Furthermore, the process of the invention is carried out under mild conditions and results in higher yields which can be almost as high as the theoretical values.

The process of the invention consists essentially in the nucleophilic displacement of the halogen atom of a 4-halo-3-nitrobenzoic acid with an alkali metal alkoxide, at a low temperature in an aprotic solvent such as dimethylsulfoxide or dimethylformamide. The obtained 4-alkoxy-3-nitrobenzoic acid can then be esterified with the appropriate dialkylaminoethanol by standard procedures and reduced in the final step to yield the desired 2-dialkylaminoethyl 4-alkoxy-3-aminobenzoate. The reaction scheme is as follows:

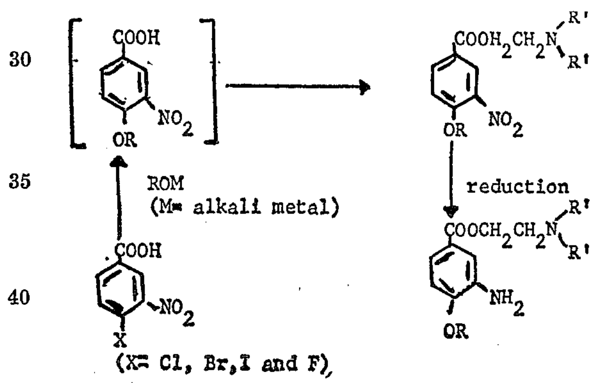

The above described three-step process, which is simpler than the known processes, can be further simplified by omitting the step of isolating the 4-alkoxy-3-nitrobenzoic acid and using instead the suspension of alkali metal salt of this acid (wherein the alkali metal is the same as that of the alkoxide) to react directly with the appropriate dialkylaminoethyl chloride: this permits the dialkylaminoethyl 4-alkoxy-3-nitrobenzoate to be isolated in a single reaction step.

To carry out the process, the 4-halo-3-nitrobenzoic acid is dissolved into an aprotic solvent, such as dimethylformamide or dimethylsulfoxide, and an alkali metal alkoxide is gradually added under stirring and with external cooling. As pointed out above, an alkoxide is one of the cheapest alkylating agents among those commonly used. When the exothermal reaction has ceased, the suspension of the alkali metal salt of 4-alkoxy-3-nitrobenzoic acid can be further reacted, e.g. with a dialkylaminoethyl chloride to give the corresponding dialkylaminoethyl 4-alkoxy-3-nitrobenzoate. When, on the contrary, one desires to isolate the free acid the suspension of the alkali metal salt of 4-alkoxy-3-nitrobenzoic acid is poured into ice-water and acidified to Congo-red with a mineral acid to give an excellent yield of the free acid. The latter is then converted to the acyl chloride, e.g. by means of thionyl chloride and the acyl chloride is reacted with the appropriate dialkylaminoethanol to give the corresponding dialkylaminoethyl ester.

The final reduction of the nitro group in 3-position can be effected by catalytic hydrogenation or by the conventional reduction procedures involving the use of the iron-hydrochloric acid system. The monohydro-chlorides of the final products are best prepared by the catalytic method.

A new and novel feature of the press of this invention consists in the alkoxylation step of 4-halo-3-nitrobenzoic acid with an alkali metal alkoxide. Surprisingly, this reaction proceeds easily and is exothermal, provided that it is carried out in aprotic solvents. If, on the contrary, the conventional solvents for alkoxides are used, such as alcohols, benzene, toluene and similar aromatic solvents, said reaction does not occur even after many hours of heating at high temperatures, e.g. 150° C. and higher. This alkoxylation step can be carried out at any temperature within practical ranges, preferably at 10–40° C. The reaction is usually carried out at room temperature, by cooling the reactor to remove the exothermal reaction heat. The fact that such a reaction can proceed so easily and exothermally in aprotic solvents was not predictable on the basis of known literature. Therefore, the process of this invention allows that the 2-dialkylaminoethyl 4-alkoxy-3-nitrobenzoates be produced in higher yields and in a simpler way. The compounds of this invention have high therapeutic usefulness as local anesthetics ["Pharmascope," vol. 9, No. LO, p. 11 (1969)] Some of these compounds have been disclosed in prior scientific works.

The following non-limitative examples illustrate the invention.

EXAMPLE 1

4-n-propoxy-3-nitrobenzoic acid

To a solution of 201 g. of 3-nitro-4-chlorobenzoic acid in 1 l. of dimethylsulfoxide (DMSO), 180 g. of sodium-n-propoxide are added with stirring in two portions at a slow rate, while keeping the internal temperature at 40° C. After addition is completed, the cooling is removed and the mixture is poured into ice-water. The solution is acidified to Congo-red with dilute sulfuric acid and the precipitate collected by suction. The product is crystallized from aqueous ethanol to give 210 g. (93% yield) of pure 3-nitro-4-n-propoxybenzoic acid; M.P. 168–170° C.

*Analysis.*—Calcd. for $C_{10}H_{11}NO_5$ (percent): N, 6.22. Found (percent): N, 6.10.

EXAMPLE 2

4-n-butoxy-3-nitrobenzoic acid

By the procedure described in the preceding Example 1, 3-nitro-4-chlorobenzoic acid and potassium n-butoxide are reacted in DMF to give a high yield of 4-butoxy-3-nitrobenzoic acid; M.P. 165–167° C. from dilute alcohol.

*Analysis.*—Calcd. for $C_{11}H_{13}NO_5$ (percent): N, 5.86. Found (percent): N, 5.75.

EXAMPLE 3

(a) 2-diethylaminoethyl 4-n-propoxy-3-nitrobenzoate hydrochloride

A solution of 3-nitro-4-chlorobenzoic acid in DMSO is reacted with two equivalents of sodium-n-propoxide with stirring at room temperature. At the end of the reaction, the sodium salt of 4-n-propoxy-3-nitrobenzoic acid precipitates and is treated directly with 1 equivalent of 2-diethylaminoethyl chloride. After warming to complete the reaction, the mixture is poured in ice-water, extracted with ether and the extracts dried over $Na_2SO_4$. The solution is then acidified with anhydrous hydrogen chloride to give a quantitative precipitate of 2-diethylaminoethyl 4-n-propoxy-3-nitrobenzoate hydrochloride; M.P. 124–127° C.

*Analysis.*—Calcd. for $C_{16}H_{24}N_2O_5.HCl$ (percent): Cl, 9.82. Found (percent) Cl, 9.80.

(b) 2-diethylaminoethyl 4-n-propoxy-3-nitrobenzoate hydrochloride

A mixture of 192 g. of 4-n-propoxy-3-nitrobenzoic acid and 300 ml. of thionyl chloride is refluxed for two hours. The excess of reagent is distilled off under reduced pressure and the residual acid chloride is dissolved in toluene, treated with 230 ml. of 2-diethylaminoethanol and warmed at 80° C. to complete the esterification. The mixture is washed with 0.5 l. of aqueous potassium carbonate and the organic layer dried over $Na_2SO_4$. The solvent is evaporated in vacuo, the residue dissolved in isopropyl alcohol and acidified with an anhydrous hydrogen chloride alcohol solution. The precipitate is collected by suction to give 280 g. (93% yield) of 2-diethylaminoethyl 4-n-propoxy-3-nitrobenzoate hydrochloride, M.P. 124–126° C.

EXAMPLE 4

2-diethylaminoethyl 4-n-butoxy-3-aminobenzoate hydrochloride 2-diethylaminoethyl 4-n-butoxy-3-nitrobenzoate hydrochloride (90 g.) is added in small portions under stirring to a boiling mixture of seven equivalents of powdered iron in 600 ml. of aqueous ethanol and 2 ml. of conc. hydrochloric acid. After completion of the exothermic reaction, heating is continued for 30 min., the mixture then is treated with an excess of powdered sodium carbonate and filtered. The residue is washed with absolute ethanol and the combined filtrates are evaporated to small volume and extracted with ether. The hydrochloride of 2-diethylaminoethyl 4-n-butoxy 3-aminobenzoate is prepared in a quantitative yield in absolute ethanol by adding an ether solution of hydrogen chloride. The precipitate is collected and crystallized from 90% ethanol; M.P. 158–160° C.

*Analysis.*—Calcd. for $C_{17}H_{29}ClN_2O_3$ (percent): Cl, 10.28. Found (percent): Cl, 10.13.

EXAMPLE 5

2-diethylaminoethyl 4-n-propoxy-aminobenzoate hydrochloride (proxymetacaine)

A solution of 276 g. of 2-diethylaminoethyl 4-n-propoxy-3-nitrobenzoate hydrochloride in 3 l. of 95% $CH_3OH$ is hydrogenated with 10 g. of 10% Pd on carbon in an atmosphere of hydrogen and under vigorous stirring. After one hour the reduction is stopped, the catalyst is removed by suction and washed with methanol. The filtrate and washings are concentrated to give a 92% yield of 2-diethylaminoethyl 4-n-propoxy-3-aminobenzoate hydrochloride melting at 180–182° C. (from ethanol).

*Analysis.*—Calcd. for $C_{16}H_{27}ClN_2O_3$ (percent): Cl, 10.72. Found (percent): Cl, 10.65.

I claim:

1. A process for preparing 2-dialkylaminoethyl 4-alkoxy-3-aminobenzoates, of the general formula:

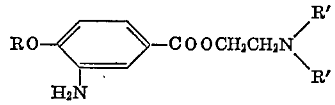

wherein R is an alkyl radical $C_1$–$C_6$ and R′ is hydrogen, methyl or ethyl, comprising the following steps:

(a) alkoxylating a 4-halo-3-nitrobenzoic acid, of the general formula:

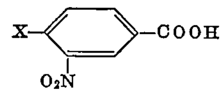

wherein X=Cl, Br, I or F, with an alkali metal alkoxide, at a moderate temperature in an aprotic solvent, to obtain a suspension of the alkali metal salt of the corresponding 4-alkoxy-3-nitrobenzoic acid;

(b) treating the suspension of step (a) with the appropriate dialkylaminoethyl chloride to obtain the corresponding dialkylaminoethyl 4 - alkoxy - 3-nitrobenzoate; and (c) reducing the said ester with iron-hydrochloric acid or by catalytic hydrogenation to obtain the desired 2-dialkylaminoethyl 4-alkoxy-3-aminobenzoate, in an almost theoretical yield.

2. A process as claimed in claim 1, wherein the suspension of step (a) is acidified to isolate the free acid and the latter is then reacted with the appropriate dialkylaminoethanol to give the corresponding dialkylaminoethyl ester, which is then reduced as indicated above in step (c).

3. A process as claimed in claim 1, wherein the alkoxylation reaction of step (a) is carried out by using dimethylformamide or dimethylsulfoxide as solvent.

4. A process as claimed in claim 1, wherein the temperature of the alkoxylation reaction of step (a) is from 10° to 40° C., and the reactor is cooled to remove the exothermal reaction heat.

5. A process as claimed in claim 1 wherein 4-chloro-3-nitrobenzoic acid is used as the 4-halo-3-nitrobenzoic acid.

6. A process as claimed in claim 1 wherein sodium or potassium n-propoxide or n-butoxide is used as the alkali metal alkoxide.

7. A process for preparing the compound of the formula:

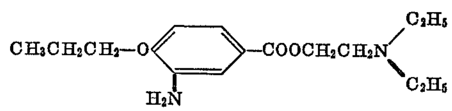

comprising reacting a dimethylsulfoxide solution of 3-nitro-4-chlorobenzoic acid with sodium n-propoxide under stirring and at room temperature; treating directly the so obtained suspension of the sodium salt of 4-n-propoxy-3-nitrobenzoic acid with 2-diethylaminoethyl chloride; hydrogenating a methanol solution of the 2-diethylaminoethyl 4-n-propoxy-3-nitrobenzoate, previously isolated as a hydrochloride, in the presence of 10% palladium on carbon; and recovering the desired 2-diethylaminoethyl 4-n-propoxy-3-aminobenzoate hydrochloride in a high yield.

References Cited

UNITED STATES PATENTS

| | | | |
|---|---|---|---|
| 2,662,889 | 12/1953 | Clinton et al. | 260—472 |
| 2,828,328 | 3/1958 | Schmidt et al. | 260—472 |
| 2,882,295 | 4/1959 | Clinton et al. | 260—472 |
| 3,134,805 | 5/1964 | Tullar | 260—472 |

LORRAINE A. WEINBERGER, Primary Examiner

L. A. THAXTON, Assistant Examiner

BEST AVAILABLE COPY

UNITED STATES PATENT OFFICE
CERTIFICATE OF CORRECTION

Patent No. 3 775 464 Dated August 10 1970

Inventor(s) Giorgio Pifferi

It is certified that error appears in the above-identified patent and that said Letters Patent are hereby corrected as shown below:

At column 2, line 28:

delete

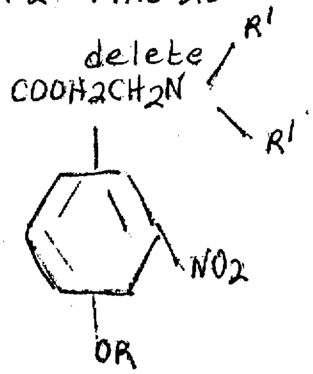

and insert

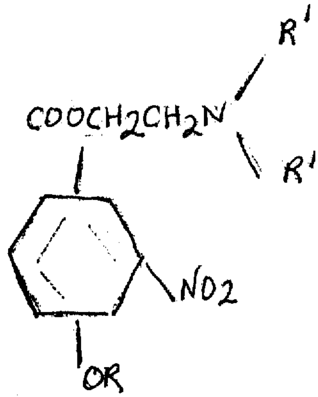

At column 3, line 7: delete "press" and insert --process--

At column 3, line 24, "nitrobenzoates" should read -- aminobenzoates --.

Signed and sealed this 21st day of January 1975.

(SEAL)
Attest:

McCOY M. GIBSON JR.
Attesting Officer

C. MARSHALL DANN
Commissioner of Patents